though prevailed for a long time to produce different layers of such a material, 3,249,645
Patented May 3, 1966

3,249,645
PREPARATION OF DIMETHYLNAPHTHALENE BY TRANSALKYLATION OF MONOMETHYLNAPHTHALENE WITH TRIMETHYLNAPHTHALENE
George Suld, Springfield, Pa., assignor to Sun Oil Company, Philadelphia, Pa., a corporation of New Jersey
No Drawing. Filed Dec. 13, 1962, Ser. No. 244,245
5 Claims. (Cl. 260—672)

This invention relates to the HF—BF$_3$ catalyzed transalkylation of monomethylnaphthalene (hereinafter MMN) with trimethylnaphthalene (hereinafter TMN) to produce a reaction product mixture which contains dimethylnaphthalene (hereinafter DMN) and which is essentially free of by-product tar.

2,6-naphthalenedicarboxylic acid is a highly desirable article of commerce, particularly in that it can be used for making polyester-type resins which have outstandingly good properties for certain applications. A very convenient method of preparing this dicarboxylic acid is by oxidation of 2,6-DMN according to, for example, the procedure described in United States patent application Serial No. 851,229 of Melchiore et al., filed November 6, 1959, now abandoned.

For commercial practice a difficulty in producing 2,6-naphthalenedicarboxylic acid lies in finding a suitable source of the 2,6-DMN isomer. This compound occurs in coal tar and cracked petroleum fractions of appropriate boiling range but only in low proportion, since it is associated with the various other DMN isomers, monocyclic aromatics, and non-aromatic hydrocarbons. One method of improving the amount of 2,6-DMN obtainable from such petroleum and coal tar fractions involves solvent extraction of the fraction to obtain a concentrate of DMN isomers, hydrogenation of the DMN isomers to the corresponding dimethyldecalin isomers, and isomerization of the mixed dimethyldecalin isomers to an equilibrium mixture containing a relatively high proportion of 2,6-dimethyldecalin. The latter compound can be separated from the mixture by fractional crystallization and can then be dehydrogenated to 2,6-DMN. Such procedures are described in United States patent application Serial No. 216,027 of Schneider, filed August 10, 1962. The amount of 2,6-DMN obtainable by such a procedure is limited, of course, by the amount of DMN isomers in the original fraction. A method has now been found by which the amount of 2,6-DMN obtainable by such a procedure can be increased. The present invention provides a method by which TMN and MMN, also found in coal tar and cracked petroleum fractions, can be converted to DMN. Thus coal tar and cracked petroleum fractions can be initially treated to convert the TMN and MMN contained therein to DMN, after which an increased amount of 2,6-DMN is recoverable by the procedures described above.

According to the invention, MMN is transalkylated to produce DMN by simultaneously contacting a mixture of MMN and TMN, dissolved in a solvent, with BF$_3$ and liquid HF at 110°–140° C., the amount of HF being at least 1 mole per mole of MMN plus TMN and the molar ratio of BF$_3$ to TMN being in the range of 0.9 to 1.1. It is a distinctive feature of the invention that the reaction product mixture containing DMN is free of tar.

It is well known that HF, either alone or in combination with BF$_3$, is an effective catalyst system for conducting a variety of organic reactions such as isomerization, disproportionation, etc. For example, McCauley et al., in United States Patent No. 2,819,324, disclose the disproportionate of ethylnaphthalene to diethylnaphthalene and other products using an HF—BF$_3$ catalyst system. Similarly Lee et al., in United States Patent No. 2,416,184, disclose the disproportionation and transalkylation of alkylaromatics using an HF catalyst. Unfortunately, when HF or HF—BF$_3$ is used to disproportionate MMN or when HF is used to transalkylate MMN, the results are far from satisfactory in that a large quantity of tar is formed, either in addition to or to the exclusion of the desired product. Thus the aforesaid McCauley et al. patent discloses that the HF—BF$_3$ catalyzed disproportionation of MMN results in the formation of 24 percent tar. Similarly, when MMN is transalkylated with TMN using an HF catalyst essentially the entire product is tar. Such tars have no known commercial use.

The description of the undesirable by-products as tar will be readily understood by one skilled in the art. They are hard, solid, high molecular weight compounds which are invariably black and which are believed to be alkylnaphthalene polymerization or condensation products, although no specific compounds in such tars have been identified because the latter are not susceptible to such powerful analytical techniques as vapor phase chromatography. On the other hand, these tars are insoluble in benzene and their presence is generally so indicated, i.e., as benzene insolubles.

It has now been found that within a certain relatively narrow range of conditions DMN can be prepared from a mixture of MMN and TMN without the formation of tar. While some by-products may be formed, they are benzene soluble compounds such as naphthalene, tetralin, and low molecular weight alkyl derivatives thereof, i.e., compounds which themselves can be used for various known purposes. The reaction which occurs in the method of the invention is a transalkylation reaction, i.e., compounds having a different number of alkyl substituents on the same nucleus react to form a compound having an intermediate number of alkyl substituents on the same nucleus. More specifically,

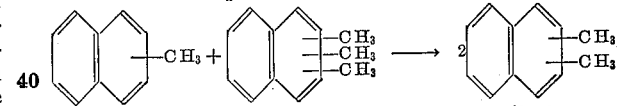

Such a reaction has sometimes been described as an "averaging" reaction.

The charge material to the method of the invention is a mixture of MMN and TMN. Such a mixture or the individual compounds can be obtained from, for example, appropriate coal tar and petroleum fractions. Preferably the mixture contains equal molar quantities of MMN and TMN in order to maximize the yield of DMN. For the present purpose the above mixture must be dissolved in a solvent; failure to do so will result in the formation of tar upon subsequent contacting with the HF—BF$_3$. Suitable solvents include hydrocarbons such as benzene, toluene, hexane, and the like. Oxygen-containing solvents such as alcohols and ethers should be avoided for the reason that they tend to react with the HF—BF$_3$ catalyst system of the invention. Benzene is the preferred solvent.

The mixture of MMN and TMN, dissolved in a solvent, is contacted simultaneously, according to the invention, with liquid HF and with BF$_3$ at a temperature in the range of 110°–140° C. A temperature of at least 110° C. is necessary in order to obtain a significant yield of the desired DMN product. Temperatures in excess of 140° C. result in the formation of tar.

The amount of HF necessary is at least one mole of HF per mole of MMN and TMN in the charge mixture. Preferably an excess of HF is used, say, 5–50 moles. The HF should be used in liquid phase; consequently, for the reaction temperature selected, sufficient pressure should be employed to maintain at least one mole of HF per mole of MMN and TMN in liquid phase.

The amount of BF₃ that should be used is 0.9 to 1.1 moles of BF₃ per mole of TMN in the charge mixture. Below a molar ratio of 0.9:1 the transalkylation reaction occurs only to a very small degree; above a molar ratio of 1.1:1 additional reactions begin to occur which result in the formation of tar.

The contacting is carried out for a time sufficient to form DMN, but in no event should the time of contact exceed about 45 minutes. Generally, substantial amounts of DMN are obtained in 5–20 minutes. A contacting time longer than about 20 minutes will usually increase the amount of DMN obtained but will also increase by-product formation with eventual formation of tar when the contacting exceeds about 45 minutes.

The contacting as described above can be carried out in conventional equipment. For example, the HF is added to an autoclave type of reactor equipped with an agitator and heating means. The BF₃ is then added, followed by a solution of the MMN and TMN charge materials in the solvent. The ingredients are then heated to 110–140° C. while being agitated to insure their intimate mixing. The pressure in the reactor at this point will generally be 100–200 p.s.i.g., usually about 150 p.s.i.g. After being held at 110°–140° C. for the specified period of time, the reaction product mixture containing DMN can be treated as hereinafter described in order to recover DMN.

While the order of mixing and heating of the ingredients as described above is not critical, it is generally desirable not to have the MMN-TMN charge mixture in contact with HF alone at the temperatures of the invention, i.e., at 110°–140° C. While at lower temperatures within this range MMN and TMN do not react in the presence of HF, they do react at higher temperatures within this range with the formation of a substantial amount of tar. Any such difficulty is easily avoided, however, by, for example, adding the BF₃ to the HF before adding the MMN-TMN charge mixture, mixing all the ingredients at room temperature (e.g., 25–30° C.) and then heating to the reaction temperature, etc.

The contacting as described above results in a reaction product mixture which contains DMN, unconverted MMN and TMN, solvent, HF, BF₃, and, in some cases, a small amount of by-products such as naphthalene, tetralin, and low molecular weight alkyl naphthalenes and alkyl tetralins. If excess HF is used, some of the aromatics will be dissolved in the HF as a complex containing one mole of aromatic, one mole of HF, and one mole of BF₃. From the reaction product mixture DMN can be recovered, either alone or in admixture with other organics, in any convenient manner. One such method is to remove the HF and BF₃ by distillation after which the remaining hydrocarbons can be, if desired, further distilled to separate DMN. The distillative removal of HF and BF₃ should be carried out at a temperature less than 110°–140° C. in order to avoid further reactions resulting in tar formation. This, of course, is not a serious problem since at atmospheric pressure HF boils at 19.4° C. and BF₃ boils at −101° C. Alternatively, DMN can be recovered from the reaction product mixture by a procedure which involves adding crushed ice to the reaction product mixture. The hydrocarbons are found as an organic layer above an aqueous acid layer. The hydrocarbon layer can be decanted and, if desired, distilled to separate DMN.

The following examples illustrate the invention more specifically:

*Example I*

A solution of 3.0 gms. (0.018 mole) 2,3,6-TMN and 2.55 gms. (0.018 mole) 2-MMN in 10 ml. benzene was charged to an 80 ml. stainless steel shaking type autoclave. Next 21.5 gms. (1.05 moles) HF and 0.018 mole BF₃ were charged to the autoclave. The mixture was heated and shaken at 120° C. for 30 minutes. At this temperature the pressure in the autoclave, due to the vapor pressure of the above ingredients, was about 140 p.s.i.g. After 30 minutes at 120° C. the contents of the reactor were quenched in crushed ice. An organic layer formed over an aqueous layer. The organic layer was light colored and clear and contained no tar. If any tar had been present, it would have been observed in the organic layer as a finely divided black precipitate thoroughly dispersed in the organic layer. The organic layer was decanted and then analyzed by gas chromatography. It contained, excluding solvent,

| | Weight percent |
|---|---|
| MMN | 31.0 |
| TMN | 17.5 |
| DMN | 35.5 |
| Other | 16.0 |
| Benzene insolubles | None |

The material identified as "other" is tetralins, naphthalene, alkylnaphthalenes other than those specifically listed, etc. Unlike tar, the "other" material dissolved in the benzene solvent.

*Example II*

The procedure was the same as in Example I except that the reaction time was 15 minutes instead of 30 minutes. Again, no tar was formed. The organic layer analyzed as follows:

| | Weight percent |
|---|---|
| MMN | 41.3 |
| TMN | 43.4 |
| DMN | 12.3 |
| Other | 3.0 |
| Benzene insolubles | None |

By comparing this analysis with that obtained in Example I it is evident that the 15-minute reaction time is superior to a 30-minute reaction time from a standpoint of by-product formation. The ratio of DMN to "other" in Example I is 2.2 while the same ratio of Example II is 4.1.

*Example III*

The procedure was the same as in Example I except that the amount of 2,3,6-TMN and 2-MMN was 0.03 mole of each, the amount of HF was 1.0 mole, the reaction temperature was 150° C. and no BF₃ was used. Thus the molar ratio of HF to MMN plus TMN was 16.7. The organic layer contained only the benzene solvent and a large amount of a finely divided black precipitate dispersed therein. No compound could be characterized from the precipitate. The formation of this black precipitate, i.e., tar, can be avoided by reducing the reaction time and/or temperature but the reduction required is such that essentially no reaction at all occurs.

*Example IV*

This example represents an attempt to disproportionate MMN alone. To the autoclave of Example I was added 1 mole of HF and 0.087 mole BF₃. Next a solution of 0.13 mole 2-MMN in 18 gms. benzene was added to the autoclave. The mixture was heated to and shaken at 80° C. for 60 minutes and was then quenched in crushed ice. Again the organic layer contained only solvent and a black precipitate dispersed therein from which no compound could be characterized. Tar can be eliminated from the reaction product by lowering the reaction temperature to about 60° C. but the only reaction which then occurs is the isomerization of a portion of the 2-MMN to 1-MMN.

I claim:

1. Method of preparing DMN comprising the steps of (1) simultaneously contacting a mixture of MMN and TMN, said mixture being disolved in a solvent, with at least 1 mole of liquid HF per mole of MMN and TMN and with BF$_3$, the molar ratio of BF$_3$ to TMN being in the range of 0.9:1 to 1.1:1, said contacting being at a temperature in the range of 110°–140° C. and being for a time sufficient to effect formation of DMN but for less than 45 minutes, and (2) recovering DMN from the reaction product mixture, said mixture being benzene soluble.

2. Method according to claim 1 wherein said solvent is benzene.

3. Method according to claim 1 wherein said HF is used in amount of 5–50 moles per mole of MMN and TMN.

4. Method according to claim 1 wherein said period of time is 5–20 minutes.

5. Method according to claim 1 wherein said solvent is a hydrocarbon.

References Cited by the Examiner

UNITED STATES PATENTS

| | | | |
|---|---|---|---|
| 2,753,383 | 7/1956 | Lien et al. | 260—672 |
| 2,819,324 | 1/1958 | McCaulay et al. | 260—672 |
| 2,834,821 | 5/1958 | Bergsteinsson | 260—672 |
| 2,837,583 | 6/1958 | Lien et al. | 260—672 |

DELBERT E. GANTZ, *Primary Examiner.*

ALPHONSO D. SULLIVAN, *Examiner.*

J. E. DEMPSEY, C. R. DAVIS, *Assistant Examiners.*